(12) United States Patent
Kunimune

(10) Patent No.: US 9,408,373 B2
(45) Date of Patent: Aug. 9, 2016

(54) ARTIFICIAL HONEYCOMB

(75) Inventor: Noriaki Kunimune, Osaka (JP)

(73) Assignee: KUNIMUNE CO., LTD., Osaka (JP)

( * ) Notice: Subject to any disclaimer, the term of this patent is extended or adjusted under 35 U.S.C. 154(b) by 881 days.

(21) Appl. No.: 13/582,269

(22) PCT Filed: Mar. 15, 2011

(86) PCT No.: PCT/JP2011/056062
§ 371 (c)(1),
(2), (4) Date: Aug. 31, 2012

(87) PCT Pub. No.: WO2011/115112
PCT Pub. Date: Sep. 22, 2011

(65) Prior Publication Data
US 2013/0017759 A1    Jan. 17, 2013

(30) Foreign Application Priority Data

Mar. 16, 2010  (JP) ................................. 2010-058945

(51) Int. Cl.
*A01K 47/04* (2006.01)

(52) U.S. Cl.
CPC ..................... *A01K 47/04* (2013.01)

(58) Field of Classification Search
CPC ....... A01K 47/04; A01K 47/00; A01K 47/02; A01K 47/06
USPC .................... 449/35, 42, 43, 44, 45
See application file for complete search history.

(56) References Cited

U.S. PATENT DOCUMENTS

| | | | | |
|---|---|---|---|---|
| 3,182,339 A | * | 5/1965 | Ellis et al. ........................ | 449/44 |
| 3,582,036 A | * | 6/1971 | Condis .................... | A01K 47/04 |
| | | | | 249/151 |
| 3,806,969 A | * | 4/1974 | Varama ........................... | 449/42 |
| 3,864,196 A | * | 2/1975 | Schmidt ................. | A01K 47/04 |
| | | | | 428/118 |
| 4,663,791 A | | 5/1987 | Nishi | |
| 7,897,091 B2 | | 3/2011 | Vidal | |
| 2005/0014449 A1 | * | 1/2005 | Pascual et al. .................... | 449/3 |

FOREIGN PATENT DOCUMENTS

| | | | | |
|---|---|---|---|---|
| DE | 4222602 A1 | * | 1/1994 | ............. A01K 47/04 |
| DE | 102006029829 A1 | * | 1/2008 | ............. A01K 47/04 |
| JP | 61-108317 A | | 5/1986 | |
| JP | 2950757 B2 | | 9/1999 | |
| JP | 2001-120104 A | | 5/2001 | |
| WO | 2008/119847 A1 | | 9/2008 | |

OTHER PUBLICATIONS

Machine translation of DE 4222602 to Schmidt, published Jan. 1994.*
Machine translation of DE 102006029829 to Schwan, dated Jan. 2008.*
International Search Report Mailed June 21, 2011 for PCT/JP2011/056062, Japanese With English Translation; 4 Pages.

* cited by examiner

*Primary Examiner* — Kathleen Alker
(74) *Attorney, Agent, or Firm* — Vedder Price, P.C.

(57) ABSTRACT

In order to artificially produce a honeycomb that is equivalent to honeycomb that honeybees produce in a natural environment, an artificial honeycomb is provided of which at least one pair of facing walls among the six walls configuring each honeycomb cell is formed in an inclined manner such that the gap between the two expands from the floor end of the walls towards the opening, and the floor plates and the walls are formed from a polylactic acid resin.

3 Claims, 5 Drawing Sheets

ARTIFICIAL HONEYCOMB

BACKGROUND OF THE INVENTION

1. Field of the Invention

The present invention relates to an artificial honeycomb to be installed for use in beekeeping equipment.

2. Description of the Related Art

Artificial beehives to be installed for use in beekeeping equipment have conventionally been produced by fitting a honeycomb foundation preliminarily made of beeswax into a hive frame and hanging the hive frame vertically in a hive box. Honeycomb foundations are formed by swaging a thin plate with a press machine and thereby forming a number of shallow recessed portions including a hexagonal frame. In hive boxes with such a honeycomb foundation hung therein, worker bees form walls and therefore honeycomb cells on hexagonal frames all over the honeycomb foundation to complete a honeycomb. Honey is then stored in the honeycomb cells.

Patent Document 1: Japanese Utility Model No. 3120954

Beekeeping using such an artificial honeycomb foundation as mentioned above requires three to four months to form honeycomb cells on the honeycomb foundation to complete a honeycomb, and eventually starts to store honey after the completion of the honeycomb. Therefore, it takes a substantial period of time before stored honey can be harvested. This creates a problem of extremely low efficiency in honey production.

However, walls of honeycomb cells formed by honeybees are very thin, which makes it difficult to artificially produce a honeycomb equivalent to that produced by honeybees in a natural environment using easily deformable beeswax.

SUMMARY OF THE INVENTION

In order to solve the above-described problems, the present invention provides an artificial honeycomb to be hung and used vertically in a hive box, including a honeycomb structure in which a number of honeycomb cells each having a hexagonal opening and formed in a manner surrounded by a floor plate and six walls standing on the front side of the floor plate are juncturally arranged on the front side of the floor plate, in which at least one pair of facing walls among the six walls configuring each honeycomb cell is formed in an inclined manner such that the gap between the facing walls expands from the floor end of the walls toward the opening, and in which the floor plate and the walls are formed from polylactic acid resin.

The artificial honeycomb according to the present invention is formed by molding polylactic acid resin. The method of molding is preferably extrusion molding, and more preferably injection molding.

Polylactic acid resin adopted in the present invention may contain thermoplastic resin, however, the higher the content of polylactic acid resin, the more easily the used artificial honeycombs can be degraded by soil microbes. The environmental burden of waste products can thus be reduced.

The thermoplastic resin preferably includes aliphatic polyester such as polycaprolactone or polybutylene succinate, polyethylene, polyvinyl chloride, polystyrene, or polypropylene, or may be a copolymer or mixture of two or more thereof.

The opening is preferably formed such that the distance between one side and the opposite side is within the range from 4.5 to 6.0 mm. If the distance is smaller than 4.5 mm, it is too narrow for worker bees to put their heads inside and work in the honeycomb cells. If the distance is greater than 6.0 mm, the probability of male bees coming out of the eggs increases, that is, the percentage of worker bees, which have a role in collecting honey, decreases.

The walls are preferably formed to have a height of 2 to 15 mm, and more preferably 7 to 15 mm. If the walls are lower than 2 mm, worker bees extend the walls in the height direction, which results in a delay in starting honey storage. Thus, in order to prevent delay until worker bees complete the walls, the walls preferably have a height of 2 mm or more, and more preferably 7 mm or more. On the other hand, if the walls are higher than 15 mm, the queen bee cannot bring her abdomen into contact with the surface of the floor plate, which discourages normal egg laying and thereby limits the multiplying of worker bees. Further, in order to encourage worker bees to efficiently produce an artificial honeycomb, the walls preferably have a height of 8 to 12 mm.

The walls are preferably formed to have a thickness of 0.1 to 1.0 mm, and more preferably 0.1 to 0.5 mm. If the walls are thinner than 0.1 mm, the possibility of breakage of the walls during molding increases, which results in a reduction in production yield. If the walls are thicker than 1.0 mm, the number of honeycomb cells formable in one artificial honeycomb decreases, which results in a reduction in the amount of honey storage. In order to achieve high-yield production of artificial honeycombs as well as to ensure a sufficient amount of honey storage, the walls are preferably formed to have a thickness of 0.15 to 0.4 mm.

Forming at least one pair of facing walls among the six walls configuring each honeycomb cell in an inclined manner such that the gap between the facing walls expands from the floor end of the walls toward the opening allows for easier demolding of resin after molding. This can improve the production yield even if the walls may have a small thickness of 0.1 to 0.5 mm.

In addition, walls formed in an inclined manner such that the gap therebetween expands are preferably one pair of facing walls. This can prevent the space in each honeycomb cell from being excessively narrowed, which makes it possible to ensure a sufficient space in each honeycomb cell while achieving easier demolding of polylactic acid resin.

If the space in each honeycomb cell is excessively narrowed, worker bees cannot put their heads inside and work in the honeycomb cell, which may make it difficult to store honey. Also, the queen bee cannot put her abdomen sufficiently in the honeycomb cell, which may make it difficult to lay eggs on the floor plate and result in limiting the multiplying of worker bees. Forming one pair of facing walls in an inclined manner such that the gap therebetween expands to ensure a sufficient space in each honeycomb cell can prevent the operation of honeybees from being hindered as well as the efficiency of honey production from decreasing.

More preferably, the angle of inclination of the pair of walls with respect to a line perpendicular to the floor plate is made within the range from 0 degrees 20 minutes to 0 degrees 40 minutes in the direction of expansion of the opening.

Thus arranging the angle of inclination of the pair of walls makes it possible to ensure a sufficient space in each honeycomb cell while achieving easier demolding of polylactic acid resin, and thereby to achieve an optimum artificial honeycomb.

More preferably, the honeycomb cells are formed in an upward inclined manner with the artificial honeycomb being hung in the hive box.

Forming the honeycomb cells in an upward inclined manner allows the central axis in the depth direction of each honeycomb cell to be positioned in an obliquely upward manner when the artificial honeycomb fitted in the hive frame is hung in the hive box. This can prevent honey stored in the honeycomb cells from flowing out and thereby can reliably hold honey in the honeycomb cells.

More preferably, when the artificial honeycomb is hung in the hive box, the angle of upward inclination of the honeycomb cells with respect to the horizon is made greater than 0 degrees and equal to or smaller than 10 degrees.

Thus arranging the angle of upward inclination of the honeycomb cells can reliably hold stored honey in the honeycomb cells as well as can prevent the demolding of polylactic acid resin from being hindered after molding of the artificial honeycomb. However, in order to achieve even easier demolding of the molded artificial honeycomb, the angle of upward inclination of the honeycomb cells with respect to the horizon is more preferably greater than 0 degrees and equal to or smaller than 5 degrees.

Since polylactic acid resin forming the floor plate and the walls is biodegradable resin, the used artificial honeycomb can be buried and disposed of in the ground.

Conventional honeycomb foundations, which are made of beeswax and easy to deform, require metal wires for fixation in a hive frame. For this reason, disposing of used honeycomb foundations fitted in hive frames with no treatment results in that such metal wires remain as residue and thus places a burden on the environment. On the other hand, disposal after removing all such metal wires used to fix honeycomb foundations in consideration of the environment takes quite a lot of work, causing a further reduction in the efficiency of honey production.

In the present invention adopting polylactic acid resin, since the honeycomb foundation has sufficient strength after molding, the hive frame may also be produced by molding polylactic acid resin, for example, and the honeycomb foundation may be fitted and fixed for use in the hive frame without using metal wires, unlike the conventional approach. This allows not only the used artificial honeycomb to be detached from the hive frame and disposed of with no treatment, but also the artificial honeycomb to be disposed of while being fitted in the hive frame.

This can reduce the work required for the disposal of used artificial honeycombs and thereby can further improve the efficiency of honey production.

The artificial honeycomb is preferably formed through injection molding such that the floor plate has a size of approximately 100 mm in the vertical direction and approximately 100 mm in the horizontal direction. The floor plate may have a size of approximately 100 mm in the vertical direction and approximately 200 mm in the horizontal direction or a size of approximately 200 mm in the vertical direction and approximately 200 mm in the horizontal direction. The larger the size of the floor plate, the higher the production efficiency becomes.

In addition, beekeeping using the artificial honeycomb according to the present invention aims at harvesting honey as well as pollinating flowers.

According to the present invention, it is possible to immediately start honey storage without the need for honeybees to form new honeycomb cells. This can shorten the period before honey can be harvested and thereby can improve the efficiency of honey production.

In addition, since the present invention adopts polylactic acid resin, the used artificial honeycomb can be buried and degraded in the ground, that is, can be disposed of without placing any burden on the environment with less work.

DETAILED DESCRIPTION OF THE PREFERRED EMBODIMENT

An embodiment of the present invention will hereinafter be described in detail with reference to the accompanying drawings.

Figure 1:
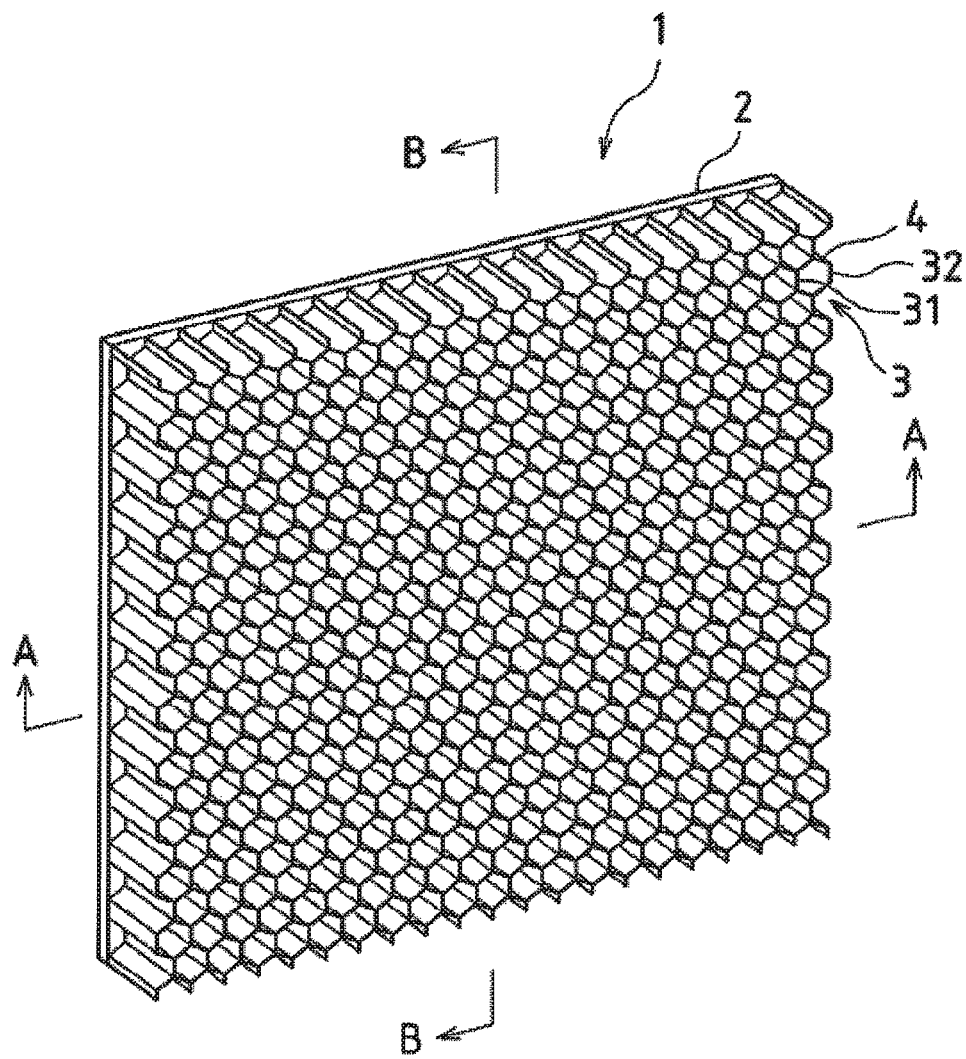
FIG. 1 is an overall perspective view of an artificial honeycomb 1.

FIG. 1 is an overall perspective view of an artificial honeycomb 1 according to the present invention, in which walls 3 stand on the front side of a floor plate 2 to form a honeycomb structure. Every six walls 3 are linked to form one honeycomb cell 4, and a pair of left and right facing walls among the six walls 3 is defined as a left wall 31 and a right wall 32.

In the present embodiment, the artificial honeycomb 1 is formed through injection molding such that the floor plate 2 has a size of approximately 100 mm in the vertical direction and approximately 100 mm in the horizontal direction.

The opening of each honeycomb cell 4 is formed in a regular hexagonal shape such that the distance between one side and the opposite side forming the opening is within the range from 4.7 to 5.0 mm. The walls 3 are formed to have a height of 8 to 12 mm and a thickness of 0.15 to 0.40 mm.

Figure 2:
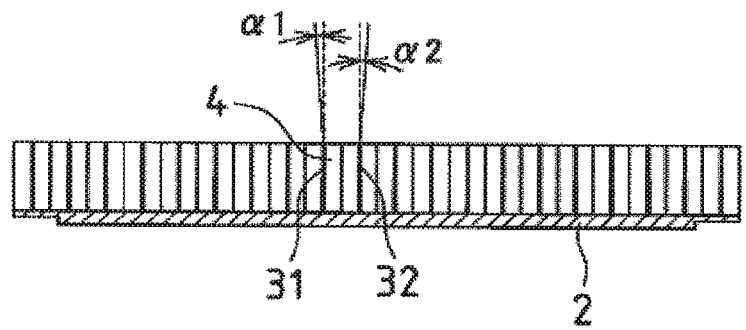
FIG. 2 is a horizontal cross-sectional view of the artificial honeycomb 1 along the line A-A, showing an inclination of a left wall 31 and a right wall 32.
Figure 2A:
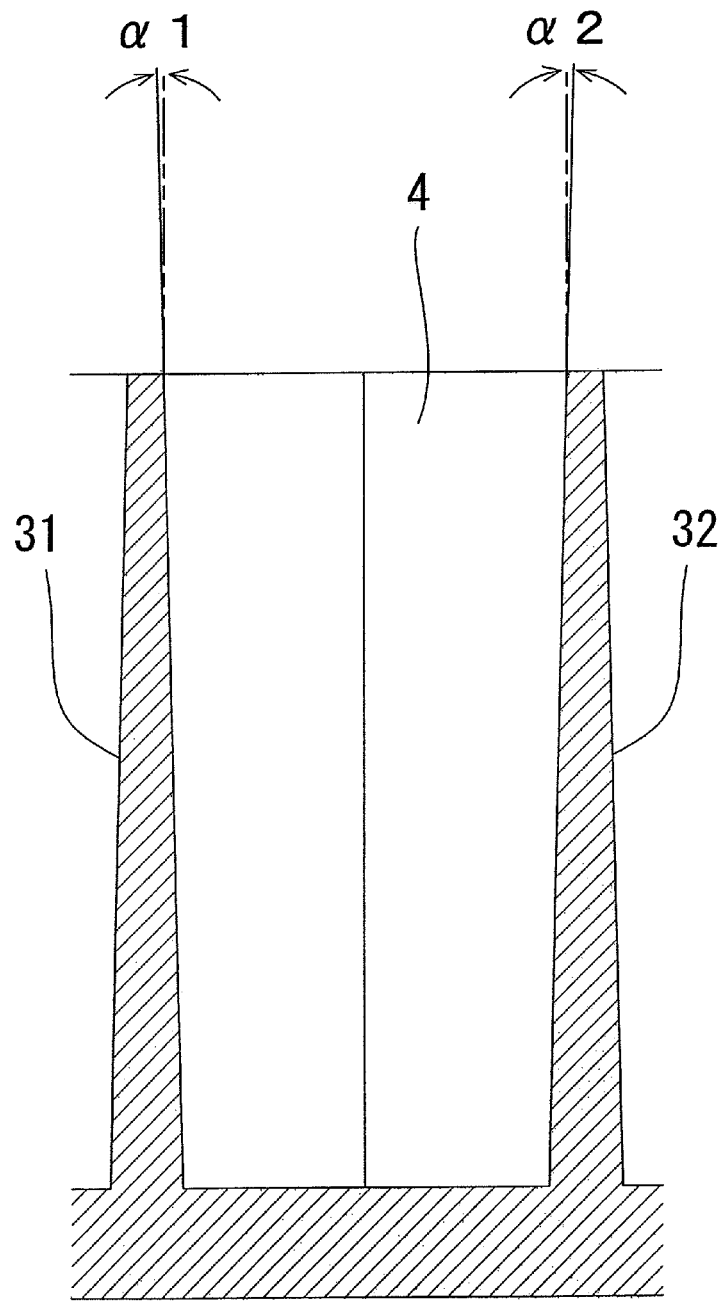
FIG. 2a is an enlarged view of FIG. 2, showing the narrowing of the walls 31,32 at the opening of the honeycomb cell 4.

As shown in FIG. 2, the left wall 31 and the right wall 32 are formed in an inclined manner such that the gap therebetween expands from the floor end toward the opening. In the present embodiment, the angles of inclination $\alpha 1$ and $\alpha 2$ of the respective left and right walls 31 and 32 with respect to lines (dashed lines in FIG. 2) perpendicular to the floor plate are both 0 degrees 30 minutes.

Figure 3:
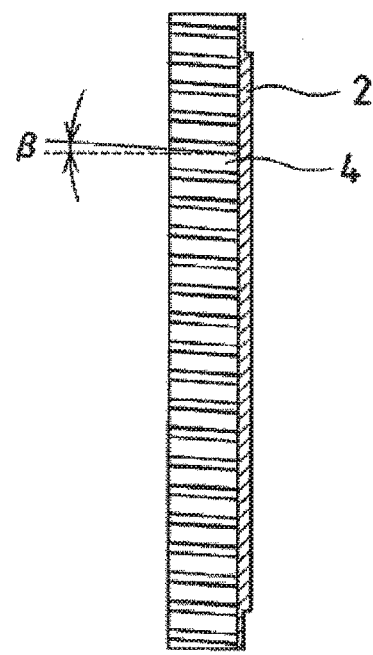
FIG. 3 is a vertical cross-sectional view of the artificial honeycomb 1 along the line B-B, showing an upward inclination of a honeycomb cell 4.

As shown in FIG. 3, the honeycomb cells 4 are formed in an upward inclined manner. In the present embodiment, the angle of the inclination $\beta$ with respect to a line (dashed line in FIG. 3) perpendicular to the floor plate is 4 degrees.

Figure 4:
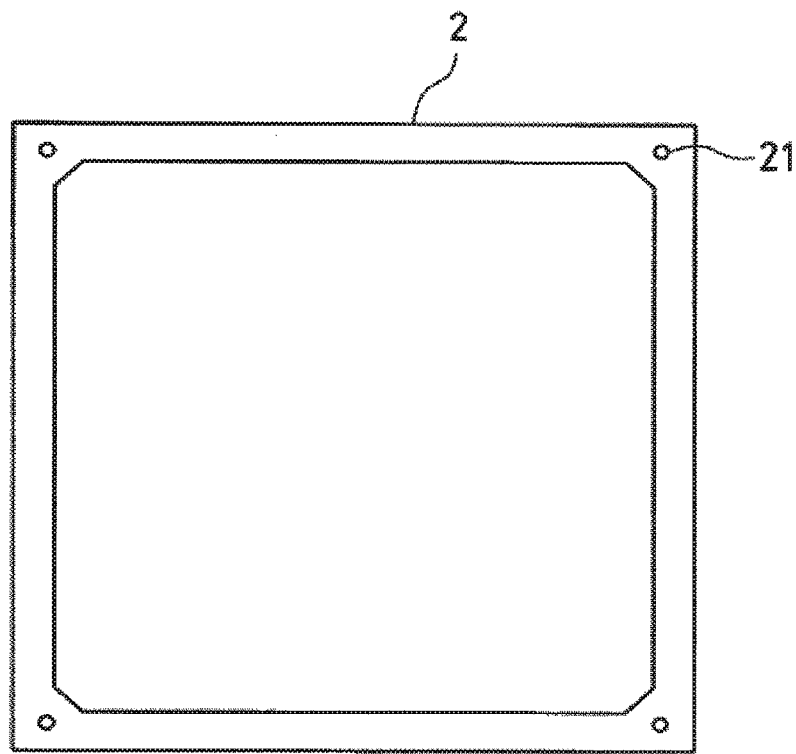
FIG. 4 is a back view of the artificial honeycomb 1.
Figure 5:
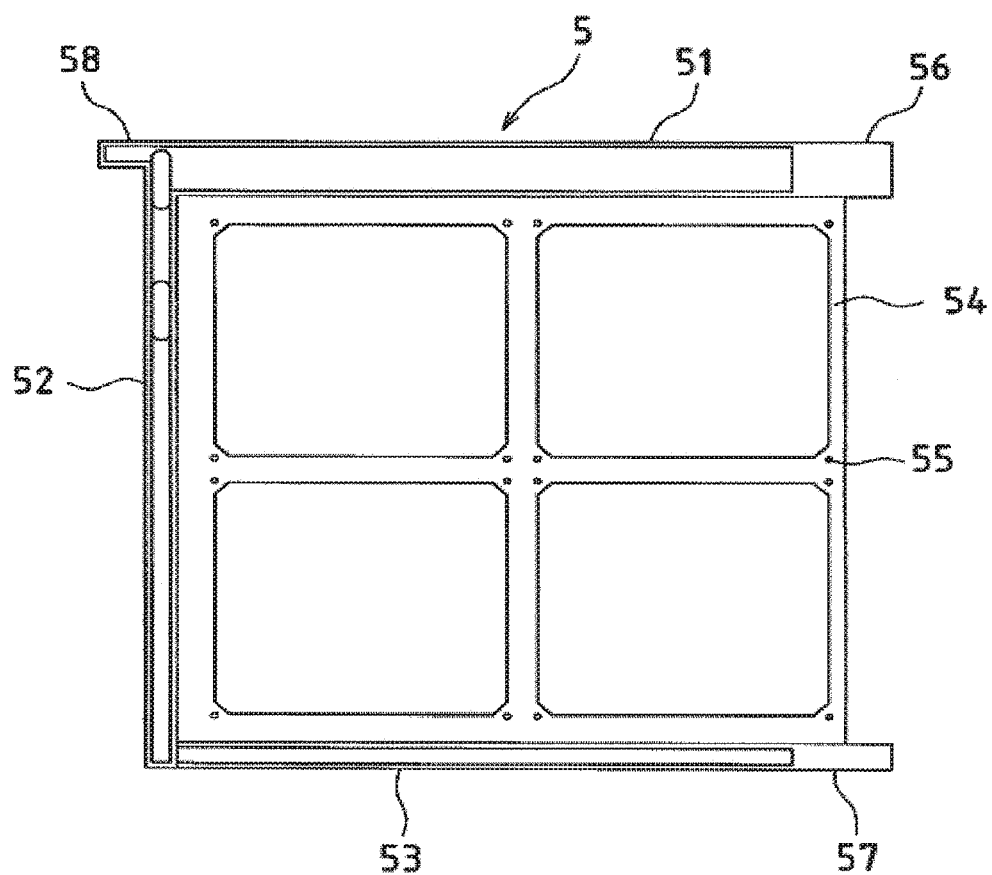
FIG. 5 is a front view of a hive frame 5.

As shown in FIG. 5, the molded artificial honeycomb 1 is preferably fitted into an attachment 54 of a hive frame 5 formed from polylactic acid resin for use therewith. The hive frame 5 is provided with an upper frame 51, a side frame 52, and a lower frame 53 on three sides, within which the attachment 54 is formed to fit the artificial honeycomb 1 therein. No frame is formed on the opposite side of the side frame 52. In the present embodiment, the attachment 54 has a size of approximately 200 mm in the vertical direction and approximately 200 mm in the horizontal direction. The surface of the attachment 54 is divided into four sections. The artificial honeycomb 1 can be fixed by fitting recessed portions 21 formed at the four corners on the back side of the artificial honeycomb 1 (see FIG. 4) to convex portions 55 formed at the four corners in each section. The fixation process is repeated to fit four artificial honeycombs 1 into the attachment 54.

In addition, the artificial honeycomb 1 may be formed such that the floor plate 2 has a size of approximately 100 mm in the vertical direction and approximately 200 mm in the horizontal direction so that the attachment 54 can be covered with two such artificial honeycombs 1.

Figure 6:
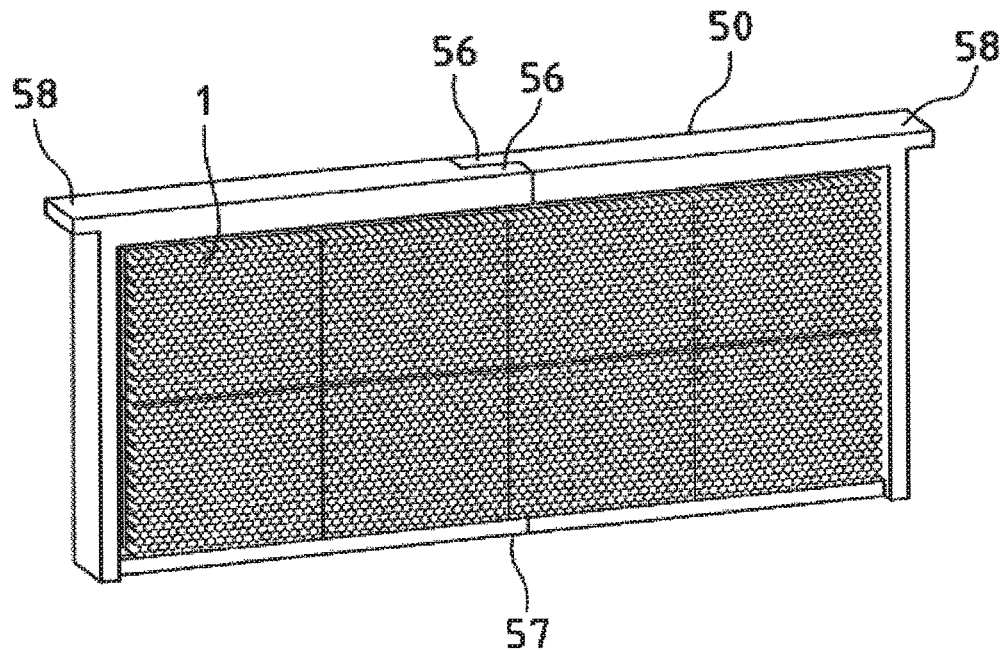
FIG. 6 is an overall perspective view of a hive frame 50 formed by joining two hive frames 5 with such artificial honeycombs 1 fitted therein.

No frame is provided on one side of the hive frame 5, and suspensions 56 and 57 are formed, respectively, at one ends of the upper and lower frames 51 and 53. Thus, by preparing two hive frames 5 with artificial honeycombs 1 fitted therein and joining the suspensions 56 together as well as the suspensions 57 together, a hive frame 50 with eight such artificial honeycombs 1 fitted continuously therein can be formed as shown in FIG. 6.

Figure 7:
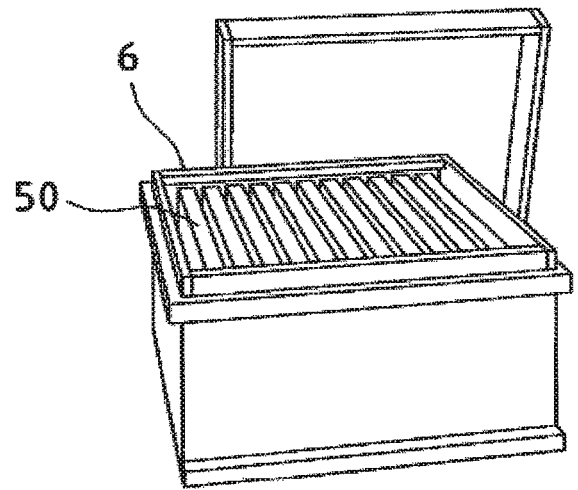
FIG. 7 shows a state where the hive frame 50 is hung in a hive box 6.

At the other end of the upper frame 51, a latching piece 58 is provided in a manner so as to protrude horizontally. When the hive frame 50 is formed, such latching pieces 58 are formed at the ends on the upper side of the hive frame 50. This arrangement allows multiple hive frames 50 to be latched and hung on the outer edge of a hive box 6, as shown in FIG. 7, to perform beekeeping.

The hive frame 5, which is thus formed from polylactic acid resin, and the artificial honeycomb 1 can be buried and disposed of in the ground with no treatment after being used for harvesting honey, requiring only reduced disposal work.

1 Artificial honeycomb
2 Floor plate
3 Wall
31 Left wall
32 Right wall
4 Honeycomb cell

What is claimed is:

1. An artificial honeycomb to be hung and used vertically in a hive box, the artificial honeycomb comprising:
    a honeycomb structure in which a number of honeycomb cells each having a hexagonal opening and formed in a manner surrounded by a floor plate and six walls standing on a front side of the floor plate are juncturally arranged on the front side of the floor plate, wherein facing walls among the six walls configuring each honeycomb cell are formed in an inclined manner such that a gap between the facing walls expands from a floor end of the walls proximate the floor plate toward an opening end of the walls opposite the floor end,
    wherein the angle of inclination of each of the six walls with respect to a line perpendicular to the floor plate is made within the range from 0 degrees 20 minutes to 0 degrees 40 minutes in the direction of expansion of the opening,
    wherein the opening is formed such that the distance between one side and the opposite side is within the range from 4.5 to 6.0 mm,
    wherein each of the six walls are formed to have a height of 8 to 12 mm,
    wherein the opening ends of each of the six walls are formed to have a thickness of 0.15 to 0.4 mm,
    wherein the floor plate has a size of 100 mm to 200 mm in the vertical direction and 100 mm to 200 mm in the horizontal direction,
    and wherein the floor plate and the walls are made from polylactic acid resin and formed by injection molding.

2. The artificial honeycomb according to claim 1, wherein the honeycomb cells are formed in an upward inclined manner forming an angle of upward inclination of the honeycomb cells with respect to the horizon, with the artificial honeycomb being hung in the hive box.

3. The artificial honeycomb according to claim 2, wherein when the artificial honeycomb is hung in the hive box, the angle of upward inclination of the honeycomb cells with respect to the horizon is greater than 0 degrees and equal to or smaller than 10 degrees.

\* \* \* \* \*